United States Patent
Keenan et al.

(10) Patent No.: US 7,200,243 B2
(45) Date of Patent: Apr. 3, 2007

(54) SPECTRAL MIXTURE PROCESS CONDITIONED BY SPATIALLY-SMOOTH PARTITIONING

(75) Inventors: Daniel M. Keenan, Charlottesville, VA (US); Robert S. Rand, Fairfax Station, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 804 days.

(21) Appl. No.: 10/603,666

(22) Filed: Jun. 26, 2003

(65) Prior Publication Data

US 2005/0047663 A1 Mar. 3, 2005

Related U.S. Application Data

(60) Provisional application No. 60/392,279, filed on Jun. 28, 2002.

(51) Int. Cl.
*G06K 9/00* (2006.01)
(52) U.S. Cl. .................... 382/100; 382/191
(58) Field of Classification Search ............ 382/11, 382/155, 156, 159, 190, 191, 204, 224, 225, 382/228, 249, 254, 266, 275, 284, 325; 702/76, 702/189, 194, 196
See application file for complete search history.

(56) References Cited

U.S. PATENT DOCUMENTS

| 6,038,344 | A | 3/2000 | Palmadesso et al. |
| 6,075,891 | A * | 6/2000 | Burman .................. 382/191 |
| 6,167,156 | A | 12/2000 | Antoniades et al. |
| 6,208,752 | B1 * | 3/2001 | Palmadesso et al. ........ 382/155 |
| 6,282,301 | B1 | 8/2001 | Haskett |
| 6,504,943 | B1 * | 1/2003 | Sweatt et al. ............... 382/103 |
| 6,771,798 | B1 * | 8/2004 | Haas et al. ................. 382/103 |
| 2002/0012451 | A1 | 1/2002 | Lin |
| 2003/0012398 | A1 | 1/2003 | Sunshine et al. |

\* cited by examiner

*Primary Examiner*—Jingge Wu
*Assistant Examiner*—Abolfazi Tabatabai
(74) *Attorney, Agent, or Firm*—Earl H. Baugher, Jr.

(57) ABSTRACT

A method that facilitates identification of features in a scene enables enhanced detail to be displayed. One embodiment incorporates a multi-grid Gibbs-based algorithm to partition sets of endmembers of an image into smaller sets upon which spatial consistency is imposed. At each site within an imaged scene, not necessarily a site entirely within one of the small sets, the parameters of a linear mixture model are estimated based on the small set of endmembers in the partition associated with that site. An, enhanced spectral mixing process (SMP) is then computed. One embodiment employs a simulated annealing method of partitioning hyperspectral imagery, initialized by a supervised classification method to provide spatially smooth class labeling for terrain mapping applications. One estimate of the model is a Gibbs distribution defined over a symmetric spatial neighborhood system that is based on an energy function characterizing spectral disparities in both Euclidean distance and spectral angle.

20 Claims, 4 Drawing Sheets

SPECTRAL MIXTURE PROCESS CONDITIONED BY SPATIALLY-SMOOTH PARTITIONING

RELATED APPLICATIONS

Under 35 U.S.C § 119(e)(1), this application claims the benefit of prior co-pending U.S. Provisional Patent Application Ser. No. 60/392,279 "Spectral Mixture Process Conditioned By Spatially-Smooth Partitioning," by Rand et al., filed Jun. 28, 2002.

STATEMENT OF GOVERNMENT INTEREST

Under paragraph 1(a) of Executive Order 10096, the conditions under which this invention Was made entitle the Government of the United States, as represented by the Secretary of the Army, to an undivided interest therein on any patent granted thereon by the United States. This patent has multiple assignees. This and related patents are available for licensing to qualified licensees. Please contact John Griffin at 703 428-6265, Phillip Stewart at 601 634-4113, or Alan R. Bentley at 434 982-1615.

FIELD OF THE INVENTION

The field is hyperspectral imaging, in particular an improved method of terrain categorization, including post-processing smoothing on a number of distinct classification techniques.

BACKGROUND

Multispectral and hyperspectral images are composed of amounts of data that are impractical to analyze manually. These data include multiple spectral bands that are not visualized or assessed readily. Conventional multispectral sensors provide only a few spectral bands of imagery, nominally covering pre-specified portions of the visible to the near infrared spectra. Conventional hyperspectral sensors may cover hundreds of spectral bands spanning a pre-specified portion of the electromagnetic spectrum. Thus, hyperspectral sensors may provide greater spectral discrimination than multispectral sensors and allow non-literal processing of data to detect and classify material content as well as structure.

An image may be represented mathematically as a matrix of m rows and n columns of elements. An element of such a matrix defining a two-dimensional (2-D) image is termed a picture element, or pixel. An image is usable when a viewer is able to partition the image into a number of recognizable regions that correspond to known features, such as trees, lakes, and man-made objects. Once this level of imaging is attained, each distinct feature and object may be identified since each is represented by an essentially uniform field. The process that generates such uniform fields is known as segmentation.

Many techniques have been used to segment images. Segmentation may be class-interval based, edge-based, and region-based.

For 8-bit precision data, a given image may assume pixel (element) values from a minimum of zero to a maximum of 255. By mapping into one category those pixels whose intensity values are within a certain range or class interval, e.g., 0–20, a simple threshold method may be used to segment.

An edge may be defined by observing the difference between adjacent pixels. Edge-based segmentation generates an edge map, linking the edge pixels to form a closed contour. In conventional edge-based segmentation, well-defined mathematical formulae are used to define an edge. After edges are extracted, another set of mathematical rules may be used to join, eliminate, or both join and eliminate edges, thus generating a closed contour around a uniform region. That is, the scene itself is not used to define an edge even though, globally, an edge may be defined by the scene.

Region-based segmentation is the antithesis of edge-based segmentation. It begins at the interior of a potentially uniform field rather than at its outer boundary. It may be initiated with any two interior adjacent pixels. One or more rules, such as a Markov Random Field (MRF) approach, are used to decide whether merging of these two candidates should occur. In general, conventional region-based segmentation is performed on an image within but a single spectral band, follows well-defined mathematical decision rules, is computationally intensive, and thus expensive, and is not self-determining or self-calibrating.

Color-based segmentation requires input of three spectrally distinct bands or colors. A true color video image may be generated from a scene taken by three bands of blue, green and red. They may be combined into a composite image using individual filters of the same three colors. The resultant color image may be considered a segmented image because each color may represent a uniform field.

If a region or an edge may be generated from the content of the scene, it should be possible to integrate both region-based and edge-based segmentation methods into a single, integrated process. The process by which a segment, or region, is matched with a rule set, or model, is termed identification.

Identification occurs after segmentation. It results in labeling structure using commonly-accepted names, such as river, forest or automobile. While identification may be achieved in a number of ways, such as statistical document functions and rule-based and model-based matching, all require extracting representative features as an intermediate step. Extracted features may be spectral reflectance-based, texture-based, and shape-based.

Statistical pattern recognition uses standard multivariable statistical methods. Rule-based recognition schemes use conventional artificial intelligence (AI). Shape analysis uses a model-based approach that requires extraction of features from the boundary contour or a set of depth contours. Sophisticated features that may be extracted include Fourier descriptors and moments. Structure is identified when a match is found between observed structure and a calibration sample. A set of calibration samples constitutes a calibration library. A conventional library is both feature and full-shape based.

Feature extraction uses a few, but effective, representative attributes to characterize structure. While it capitalizes on economy of computation, it may select incorrect features and use incomplete information sets in the recognition process. A full-shape model assumes that structure is not contaminated by noise, obscured by ground clutter, or both. In general, this assumption does not correspond to the operation of actual sensors.

Depth contours match three-dimensional (3-D) structure generated from a sensor with 3-D models generated from wire frames. In general, all actual images are 3-D because the intensity values of the image constitute the third dimension, although all are not created equal. For example, a LADAR image has a well-defined third dimension and a general spectral-based image does not. However, most objective discrimination comes from the boundary contour, not the depth contour.

Detection, classification (segmentation), and identification techniques applied to hyperspectral imagery are inherently either full-pixel or mixed-pixel techniques in which each pixel vector in the image records the spectral information. Full-pixel techniques operate on the assumption that each pixel vector measures the response of one predominate underlying material, or signal, at each site in a scene. However, the underlying assumption for mixed-pixel techniques is that each pixel vector measures the response of multiple underlying materials, or signals, at each site. In actuality, an image may be represented best by a combination of the two. Although some sites represent a single material, others are mixtures of multiple materials. Rand, Robert S. and Daniel M. Keenan, *A Spectral Mixture Process Conditioned by Gibbs-Based Partitioning*, IEEE Transactions on Geoscience and Remote Sensing, Vol. 39, No. 7, pp. 1421–1434, July 2001.

The simplest full-pixel technique involves spectral matching. Spectra of interest in an image are matched to training spectra obtained from a library or the image itself. Metrics for determining the degree of match include: Euclidian distance, derivative difference, and spectral angle. If the relative number of mixed pixels in a scene is significant, then spectral matching of this type should not be used. Class label assignments generated by spectral matching algorithms are not affected by spatial neighborhoods, however, consistency of class labels in localized spatial neighborhoods, termed "spatial localization," is important in mapping applications.

Other full-pixel methods include various supervised and unsupervised segmentation techniques. These are based on statistical and pattern recognition methods normally used for multispectral image processing. The training is also done using data from libraries or the scene imagery itself. Specific techniques include: statistical linear discrimination, e.g., Fisher's linear discriminant; quadratic multivariate classifiers, e.g., Mahalanobis and Bayesian maximum likelihood (ML) classifiers; and neural networks.

The quadratic methods require low-dimensional pixel vectors, and thus are preceded by a data reduction operation to reduce the number of spectral bands addressed. Effective neural networks, such as the multilayer feedforward neural network (MLFN), may be built to model quadratic and higher order decision surfaces without data reduction. Although the MLFN may be trained to identify materials perturbed by a limited amount of mixing, usually it does not include any spatial localization in the decision process.

The most common unsupervised algorithms for clustering imagery are KMEANS and ISODATA, in which the metric used in determining cluster membership is Euclidian distance. Euclidian distance does not provide an adequate response when fine structure or shapes are presented in high resolution spectra, being overly sensitive to intensity changes. Additionally, these methods do not include any spatial localization in the clustering operation.

Spectral mixture analysis (SMA) techniques used with mixed-pixel approaches address some of the shortcomings of full-pixel techniques. SMA employs linear statistical modeling, signal processing techniques, or both. SMA techniques are governed by the relationship:

$$X_s = H\beta_s + \eta_s \quad (1)$$

where:
$X_s$=observed reflected energy from site s
$\beta_s$=modeling parameter vector associated with mixture proportions at site s
$\eta_s$=random variable for model error at site s
H=the matrix containing the spectra of pure materials of interest The matrix, H, is presumed known and fixed, although for most actual materials there exist no single fixed spectral signatures to represent the pure materials.

The basic SMA may be modified to partition the H matrix into desired and undesired signatures. Subspace projections orthogonal or oblique to the undesired signatures and noise components are computed. Orthogonal subspace projection (OSP) is applied to hyperspectral imagery to suppress undesirable signatures and detect signatures of interest. This is shown in the relationship:

$$H = [D, U] \quad (2)$$

where:
D=matrix of known spectra for a target of interest
U=the matrix of undesired, but known, spectra The matrix, U, may be unknown if D is a minor component of the scene. The above modifications are best suited to targeting applications rather than mapping.

Unless reliable ground truth data are available, the task of determining the number of endmembers in a scene is non-trivial. Conventionally, a first step in working around the lack of ground truth data is to "noise whiten" the data and assess its dimensionality. One technique is the minimum noise fraction (MNF) transform. The MNF transform estimates a noise covariance matrix, $\Sigma_n$, typically accomplished using the minimum/maximum autocorrelation factors (MAF). An alternative to MAF, that is also easier to compute, is the noise adjusted principal component (NAPC) method. Other alternatives exist, some of which facilitate automation of the process. All, however, depend, on an accurate estimate of $\Sigma_n$, which may not be practical to attain.

In processing hyperspectral imagery of scenes with moderate to high complexity, either a large set of fundamental materials, termed endmembers, may exist throughout the scene, or some of the endmembers may have spectra that are similar to each other. Often these endmembers are mixed at the sub-pixel level, meaning that the signal measured at any specific point (pixel) in a scene are composed of spectra from more than one material. Because of the potentially large number of endmembers, and the possible spectral similarity of these fundamental materials, the use of one large set of endmembers for performing spectral un-mixing may cause unreliable estimates of material compositions at sites within the scene. A preferred embodiment of the present invention addresses this shortcoming.

SUMMARY

Provided is an improved method of doing mapping categorization, in particular with hyperspectral images. It includes improvements in: assessment of the type and amount of materials in a scene; unsupervised clustering of a scene; and post-processing smoothing operations suitable for application to diverse techniques for terrain categorization and classification.

An enhanced method of SMA is provided for the purpose of doing terrain categorization on hyperspectral imagery of scenes that are moderately to highly complex. In particular, partitioning the expected large, set of endmembers in the scene into a number of smaller sets is envisioned. The smaller sets may be associated with certain spatially smooth regions in a scene.

To generate the spatially smooth regions, a multi-grid Gibbs-based algorithm partitions hyperspectral imagery into regions of spectral similarity. The algorithm uses a Bayesian approach to partitioning in which spatial consistency is imposed on the spectral content of sites in each piece. This provides an estimator of an underlying and unobserved process termed a "partition process." This process coexists with other underlying and unobserved processes, one of which is termed a "spectral mixing process." The algorithm exploits the properties of an MRF, and the associated Gibbs equivalence theorem, using a suitably defined graph structure and a Gibbs distribution to model the partition process. Implementation of a preferred embodiment of the present invention provides locally smooth and uncluttered partitions to the enhanced spectral mixing process (SMP). It applies a linear mixing equation within these smooth partitions to yield both the number and identity of the endmembers in the scene.

This multi-grid partitioning aspect of the method uses an energy function that models disparities in an image. The image is defined with respect to a local neighborhood that may use spectral angle, Euclidean distance, and Kolmogorov-Smirnov (classical and mean-adjusted) measures, and combinations thereof. A non-traditional and locally extended neighborhood may be used to attain accurate global labeling. To further improve global labeling and reduce computational intensity, maximum a posteriori (MAP) estimates may be computed using an algorithm implemented as a multi-grid process. Both constrained and unconstrained multi-grid implementations may be developed.

The Gibbs-based algorithm may be initialized randomly, enablinig it to be used as an unsupervised clustering method. Further, this algorithm may be initialized with other unsupervised methods (such as with the ISODATA algorithm) or supervised methods, thus enabling a post-processing smoothing algorithm that operates on the output of various pre-specified classification techniques.

With spatial consistency being imposed on the spectral content of sites in each piece, the enhanced spectral mixing process is then computed. At each site in the scene, the parameters of a linear mixture model are estimated based on the set of endmembers that are assigned to the corresponding partition associated with that site.

DETAILED DESCRIPTION

Figure 1:
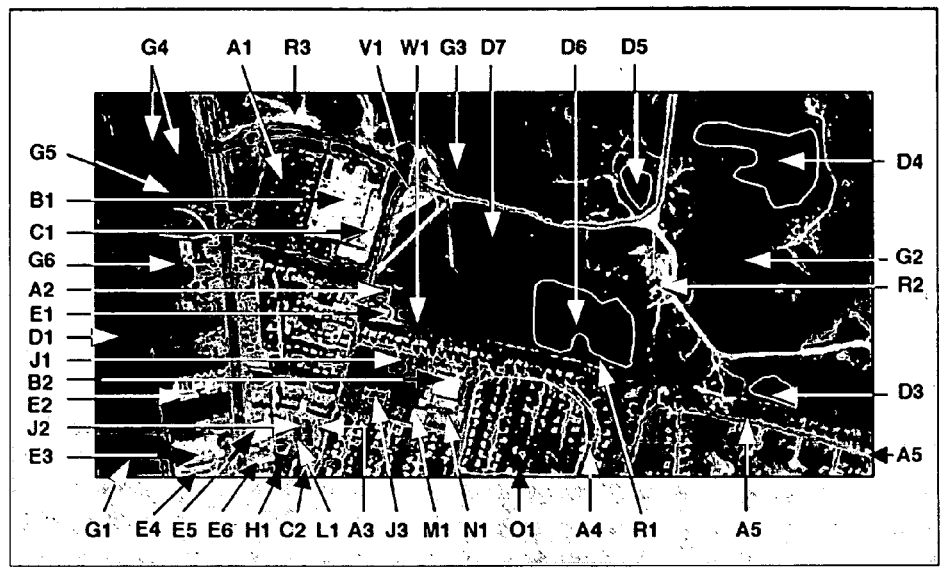
FIG. 1 is a scene taken in a particular spectra band using the HYDICE system and having superimposed ground truth overlays.

An enhanced method of SMA enables categorization of hyperspectral imagery that is moderately to highly complex. This is accomplished in part by partitioning an expected large set of endmembers in imagery into a number of smaller sets. Each of these sets is associated with its own spatially smooth region in a scene.

To generate the spatially smooth regions, a multi-grid Gibbs-based algorithm processes hyperspectral imagery using a Bayesian approach that imposes spatial consistency on the spectral content of sites chosen for each partition or set. The processing proceeds in stages from coarse to fine grid resolutions. The beginning, or coarsest, stage may be initialized randomly, i.e., totally unsupervised. Alternatively, it may be initialized using a preprocessing scheme such as another classification method which itself may be either supervised or unsupervised.

The algorithm is used to estimate an underlying and unobserved process, $X^P$, termed a "partition process," that is ultimately used to condition a spectral mixing process (SMP). This process identifies regions (sites) that may be treated as homogeneous since each region contains some culturally similar phenomenon. The term "phenomenon" is used because it is not necessary to have but a single material type at the region or site for the process to proceed.

$X^P$ is a discrete labeling Markov Random Field (MRF) process that associates a label with each site (region). The grid resolution, $\sigma$, determines the spatial sampling of the algorithm at some specific stage of multi-grid processing. The term "site", or region, refers to a generic element of a lattice. At full resolution ($\sigma=1$), a site corresponds to a single pixel. All coarser resolutions involve blocks of pixels as a square, in which $\sigma$ is the number of pixels along one side of the square.

Denoting $S_1$ as the set of sites on a lattice at full resolution then $S_P^{(\sigma)}$, the set of sites on a label lattice at the grid resolution, $\sigma$, is given by the relationship:

$$S_P^{(\sigma)} = \left\{ (i\sigma+1, j\sigma+1) : 0 \leq i \leq \frac{N_{Rows}-1}{\sigma}, 0 \leq j \leq \frac{N_{Cols}-1}{\sigma} \right\} \quad (3)$$

where at full resolution $S_P^{(o)}=S_1$. The label lattice has associate graph structures that describe, for a given element, its neighboring elements. These allow sequential formulation of well-defined probability models for $X^P$ as an MRF. Further, if S is any one of $S_P^{(o)}$: $S=\{s_1, \ldots, s_M\}$, then an associated neighborhood system $$\xi=\{\xi_s, s \in S\} \quad (4)$$

is specified. This is a set of lattice graph structures of neighbors, such that $s \notin \xi_s$, and $s \in \xi_r$ IFF $r \in \xi_s$.

The structure of the neighborhood system, $\xi_s$, forms a simple pattern. A neighborhood of a site comprises near, intermediate, and far neighbors that are specific multiples of $\sigma$. The local neighborhood is either the four closest or eight closest (perimeter) sites. Intermediate (16) and far (24) neighbors may form the next two perimeter layers away from the central site of interest at multiples of $\sigma$, i.e., three and four respectively. Use of intermediate and far neighbors facilitates a faster global solution than using just near neighbors. It also enables the algorithm to "remember" label assignments from prior stages.

Assuming a common state space in which the realizations of $X_s^P$ are $x_s^P \in \Gamma$, where $\Gamma = \{1, 2, \ldots, N_{Labels}\}$, and $N_{Labels}$ is the total number of labels assigned to the partitions, the configuration space is then defined by the relation:

$$\Omega_P^{(\sigma)} = \{x^P = (x_s^P, s \in S_P^{(\sigma)}) | x_s \in \{1, \ldots, N_{Labels}\}\} \quad (5)$$

where:
- $X^P$ = a discrete labeling processing providing class labels for identifying similar regions in a scene that is an MRF with respect to the graph $\{S_P^{(\sigma)}, \xi^{P(\sigma)}\}$
- $\xi^{P(\sigma)}$ = the neighborhood structure for the partition process at resolution $\sigma$
- $\xi_s^{P(\sigma)}$ = the specific neighborhood at sites s for the partion process at resolution $\sigma$ The goal is to find the value of $X^P$ that maximizes $Pr(X^P|G)$, for the observed G, where G is the hyperspectral image cube.

Consider $$Pr(X^P|X^\lambda) \propto Pr(X^\lambda|X^P)Pr(X^P) \quad (6)$$

where:
- $X^P$ = see above.
- $X^\lambda$ = a spectral modeling process for the underlying spectra of materials in a scene comprised of hyperspectral data
- $Pr(X^\lambda|X^P)$ = the class conditional distribution
- $Pr(X^P)$ = the prior distribution As a first approximation, assume that the image data are uncorrupted so that $X^\lambda = G$ (otherwise, $G = X^\lambda +$ "noise") and furthermore that $$Pr(G = g|X^P = x^P) = 1 \quad (7)$$

thus simplifying Eqn. (6) to $$Pr(X^P|X^\lambda) \propto Pr(X^P) \quad (8)$$

This enables an analytically tractable and computationally practical algorithm for incorporating spatial information into Eqn. (6). Note that $\underline{g}$ are the realizations of G and $x^P$ are the realization of $X^P$. The symbol, $\underline{g}$ (i.e. the underscore) emphasizes the spatial and spectral nature of the realizations of G.

Using the Gibbs Equivalent Theorem with an appropriately defined graph, $\{S_P^{(\sigma)}, \xi^{P(\sigma)}\}$, a Gibbs-based algorithm may be derived. The advantage of the Gibbs form is that an estimate may be computed that maximizes $Pr(X^P|\underline{g})$ by iteratively sampling from the local Gibbs distribution pertaining to each site $s \in S_P^{(\sigma)}$. This estimate is the MAP estimate and the local distribution is defined by the relationship $$Pr(X_s^P = x_s^P | X_r^P = x_r^P, r \neq s) = Pr(X_s^P = x_s^P | X_r^P = x_r^P, r \in \xi_s^{P(\sigma)}) \quad (9)$$

$$= \frac{1}{Z_s} e^{-\frac{1}{T} U_s(x_s^P, \underline{g})}$$

where:

$$Z_s = \sum_{x_s^P \in \Gamma} e^{-\frac{1}{T} U_s(x_s^P, \underline{g})}$$

$U_s(x_s^P, \underline{g})$ = energy interaction of site $s \in S_P^{(\sigma)}$ with the neighborhood $\xi_s^{P(\sigma)}$. Quite conveniently, the actual, computation of $Z_s$ is not required because the MAP estimate is computed using ratios of Eqn. (9).

Energy functions to be disclosed below depend on distance measures, termed "disparity metrics." These provide a measure of the dissimilarity between an individual site, s, and its neighbor, r. The measures can also be combined using sets of measures. For example, consider two useful measures, the spectral angle metric and Euclidian distance, and for a pair of sites, r and s, construct a set $$D_{r,s} = \{D_{r,s}^{(1)}, D_{r,s}^{(2)}\} \quad (10)$$

where:
- $D_{r,s}^{(1)}$ = spectral angle, between sites r and s
- $D_{r,s}^{(2)}$ = Euclidian distance, between sites r and s Two other useful measures are the following:
- $D_{r,s}^{(3)}$ = Classical Kolmogorov-Smirnov (HS), between sites r and s
- $D_{r,s}^{(4)}$ = Mean-Adjusted KS, between sites r and s Specifically, the individual measures, $D_{r,s}^{(1)}$, are further defined:

$$D_{r,s}^{(1)} = \cos^{-1}\left(\frac{\underline{g}_s \cdot \underline{g}_r}{|\underline{g}_s| \cdot |\underline{g}_r|}\right) \quad (11)$$

$$D_{r,s}^{(2)} = \sqrt{\left(\frac{(\underline{g}_s - \underline{g}_r)^T \cdot (\underline{g}_s - \underline{g}_r)}{N_{Bands}}\right)} \quad (12)$$

$$D_{r,s}^{(3)} = \sup_{\underline{g}_j} [|F_r(g_{r,j}) - F_s(g_{s,j})|] \quad (13)$$

$$D_{r,s}^{(4)} = \sup_{\underline{g}_j} [|H_r(g_{r,j}) - H_s(g_{s,j})|] \quad (14)$$

Generally speaking, the KS statistic is used to measure the significance of the difference between two univariate empirical distributions. In this embodiment, the variable $g_{r,j}$ is the response of a specific band j centered at site r in the hyperspectral cube. $F_r(g_{r,j})$ denotes the empirical distribution function modeling a window of pixels centered at the site r. $H_r(g_{r,j})$ denotes an adjusted empirical distribution function modeling a window of pixels centered at the site r, where the mean of the window of pixels is subtracted from $F_r(g_{r,j})$, and $N_{Bands}$ denotes the number of pixels in the spatial window. Therefore, $D_{r,s}^{(3)}$ in Eqn. (13) is the least upper bound of all pointwise differences $|F_r(g_{r,j}) - F_s(g_{s,j})|$. Likewise, $D_{r,s}^{(4)}$ in Eqn. (14) is the least upper bound of all pointwise differences $|H_r(g_{r,j}) - H_s(g_{s,j})|$.

Energy functions are defined to respond to the metric disparities thus defined, as well as possible others. The goal is to increase the sensitivity of the algorithm without introducing clutter. For each metric in Eqns. (11) to (14), an energy function is defined by the relationship $$U_s^{(i)}(x_s^P, \underline{g}) = \sum_{r \in \xi_s} \delta(x_s^P, x_r^P) \cdot f_i(D_{r,s}^{(i)}) \tag{15}$$

where:

$$\delta(x_s^P, x_r^P) = \begin{pmatrix} 1, x_r = x_s \\ 0, x_r \neq x_s \end{pmatrix} \text{ and}$$

the function $f_i(D_{r,s}^{(i)})$ maps $(D_{r,s}^{(i)})$ to the set $\{-1,1\}$ where:

$$f_i(D_{r,s}^{(i)}) = \begin{pmatrix} 1 \{\text{significant}\} \\ -1 \{\text{insignificant}\} \end{pmatrix} \text{distance}$$

If $D_{r,s}^{(i)} \leq K_{Thresh}^{(i)}$, then $f_i(D_{r,s}^{(i)}) = -1$, otherwise $f_i(D_{r,s}^{(i)}) = +1$.

where the threshold, $K_{Thresh}^{(i)}$, determines the sensitivity of the algorithm to the $D_{r,s}^{(i)}$ distance measure. The effect of this energy function is to accumulate the value of $f_i(D_{r,s}^{(i)})$ whenever the label of site, s, is equal to its neighbor, r.

For i=1,2 the value of the threshold $K_{Thesh}^{(i)}$ is determined through observation; specifically, $K_{Thesh}^{(1)}$ is determined by observing the differences in spectral angle for samples of the same material verses the differences in spectral angle for samples of different materials, and $K_{Thesh}^{(2)}$ is determined by observing the differences in Euclidean distance for samples of the same material verses the differences in Euclidean distance for samples of different materials. These observations should be made using a representative set of materials that have been collected under a representation set of states, e.g., due to different environmental conditions.

Note that the simplifying assumption specified by Eqn. (7) imposes the limitation that the variance of spectral signatures cannot be modeled with, say, class-conditional distributions. In the current model, a threshold is simply sought that determines whether one spectral signature is different from another signature, regardless of the class. This depends on the scale, intensities and shapes of the curves. A certain amount of subjectivity does occur inasmuch as the various pairs of classes need to be observed, and a decision has to be made about what classes the algorithm should discern as different. If classes are selected that are very close, then the algorithm is likely to generate a lot of clutter by splitting other regions that really belong to the same class. However, once this task is done (once the subjective decision, above, has been made), if the imagery is calibrated to reflectance, then the value attained should be a fairly universal value, presuming a representative set of materials has been analyzed. If the imagery has not been calibrated, then this value will depend on the range and scaling of the un-calibrated data.

For i=3, 4 a probability of false rejection α can conceivably be set (say α=0.01) and the threshold could then be determined by analytical values that characterize the KS distribution (tabulated values are available for small windows of $N_{Wind} \leq 45$ pixels, and formulas are designated for larger windows). Note that these computed estimates for the KS statistic are small-sample estimates, and the corresponding values of the analytical thresholds change according to the window size. Specifically, the threshold value becomes larger for smaller windows to compensate for the corresponding increase in variance of the estimate due to the smaller sample size. Applying the criterion in this fashion corresponds to performing the usual hypothesis testing procedure. This test of hypothesis is often too conservative to be useful in practice when applied to the non-adjusted distributions for i=3, and experiment observation is needed to set the threshold.

Further, in addition to the energy functions, Eqn. (15), that respond to a single disparity measure, an energy function can be constructed that responds to any pair of disparity measures, or any subset $D_{r,s}^{sub} \subset D_{r,s}$ of the set of disparity measures $D_{r,s}$. For example, we could define $D_{r,s}^{sub1} = \{D_{r,s}^{(1)} D_{r,s}^{(2)}\}$, i.e., Eqn. (10), as the subset that specifies the spectral angle and Euclidean distance between sites r and s. For such subsets, Eqn. (15) can be generalized as follows:

$$U_s(x^P, \underline{g}) = \sum_{r \in G_s} \delta(x_s^P, x_r^P) \cdot \max\{f_i(D_{r,s}^{(i)}), D_{r,s}^{(i)} \in D_{r,s}^{sub}\} \tag{16}$$

A simulated annealing technique is used to compute a MAP estimate from the Metropolis algorithm. Computations use a temperature, $t_k$, at iteration, k, that defines an annealing schedule described by the relationship $$t_k = \frac{C}{\ln(1+k)} \tag{17}$$

C is a parameter corresponding to the maximum depth of a "well" in the energy function of Eqns. (15) and (16). An example upper bound on C for some disparity, i, may be computed as the value computed from Eqn. (15) for which the maximum distances, $f_i(D_{r,s}^{(i)})$, of the site neighbor pairs are all different, but the labels may be assigned the same value. Computing time is minimized by using a large value of C with coarse initial grids and a smaller value as the grids become finer in subsequent iterations.

The algorithm can use two approaches to proceeding through the stages of the multigrid algorithm that are motivated and are consistent with aspects of the Renormalization Group Algorithm (RGA) method developed by Gidas for the restoration of degraded images. Gidas, B., *A Renormalization Group Approach to Image Processing Problems, IEEE Transactions on Pattern Analysis and Machine Intelligence*, Vol. 2, No. 2, February, 1989. The first approach denoted as "unconstrained simulated annealing," uses a grid-coarsening and cascading technique that is consistent with one of the techniques used in the RGA method. Specifically, a fine-to-coarse sequence with partition lattices defined by Eqn. (3) is reversed to a coarse-to-fine sequence: $S_P^{(\sigma_{NSeq})} \rightarrow \ldots \rightarrow S_P^{(\sigma_2)} \rightarrow S_P^{(1)}$, where the notation $\sigma_n$ is used to designate the grid resolution, σ, at stage "n." The results of stage "n" are used to initialize the algorithm at the next finer stage "n−1." However, unlike the RGA method, no constraints are applied.

The second approach denoted as "constrained simulated annealing" uses the same coarse-to-fine grid sequence; however, the following constraint is applied:

$$Pr^{(n)}(x^{P(\sigma_n)} | x^{P(\sigma_{n-1})}) = \prod_{s \in S_P^{(\sigma_n)}} \delta_{x_s^{P(\sigma_n)}, x_s^{P(\sigma_{n-1})}} \tag{18}$$

This constraint permanently fixes the labels assigned on completion at stage n as the algorithm proceeds to stage n−1.

An alternative to random initialization is to initialize the algorithm with the results of some prior supervised classification run. As motivation consider that a common spectral-only Bayesian approach is to use Eqn. (6) and assume that the site-specific distributions are independent so that Eqn. (6) is now $$Pr(X^P | X^\lambda) = \prod_s Pr(X_s^\lambda | X_s^P) Pr(X_s^P) \qquad (19)$$

and to further assume equal prior probabilities, i.e., all the $Pr(X_s^P)$ are equal. Consequently, each site in an image may be classified independently of the other sites by selecting $\hat{x}_s^P$ to maximize $Pr(X_s^\lambda | X_s^P)$. Further assume class-conditional distributions of this type to be multivariate normal, thus implying the classification rule:

$$\hat{x}_s^P = \arg \max N(\mu_{x_s^P}, \Sigma_{x_s^P}) \qquad (20)$$

where:
$\mu_{x_s^P}$=the mean of the spectal vectors for the class label, $x_s^P$
$\Sigma_{x_s^P}$=the covariance of these vectors Eqn. (20) is a well-known quadratic multivariate classifier used in many pattern recognition scenarios. Therrien C., *Decision Estimation and Classification—An Introduction to Pattern Recognition and Related Topics*, John Wiley and Sons, 1989. Winkler G., *Image Analysis, Random Fields and Dynamic Monte Carlo Methods—A Mathematical Introduction, Applications of Mathematics*, Springer-Verlag, 1995. Although the multivariate normal assumption is often violated, it provides a far better approximation to the true distribution of the class-conditional spectral data than the simplifying assumption of Eqn. (7).

The classification rule in Eqn. (20) may be simplified further with additional assumptions about the class covariance matrices. Specifically, if the approximation is made that $\Sigma_{x_s^P} = I$, the Identity Matrix, for all $x_s^P \in \Gamma$, then the classification rule simply reduces to the Euclidean distance classifier, which is a linear classifier. Therrien (1989) and Winkler (1995).

The partitioning algorithm has the advantage of incorporating spatial information and smoothing but the disadvantage of using a crude class-conditional distribution. The classifier provided in Eqn. (20) uses a better approximation to the true class-conditional (spectral-only) distribution and may be shown to be the optimal classifier when the underlying assumptions are met; however, it does not model any spatial interaction or provide any spatial smoothing that could be provided by a spectral/spatial prior distribution $Pr(X^P)$.

Initializing a partitioning algorithm with the results of a classifier that computes Eqn. (20) offers the potential for improved classification by providing initial estimates based on labels that, applied under the proper conditions, are spectrally optimal. Accordingly, the following two-step procedure provides a process for extracting features from hyperspectral data:

Step 1: Perform a classification of the scene using a supervised classifier of the form of Eqn. (20).

Step 2: Perform a spectral/spatial partitioning of the scene based on Eqn. (9) initialized by the results in Step 1.

Implemented in this manner, the algorithm may also be viewed as a spectrally-optimal supervised classification algorithm that has been smoothed by a post-processing routine that imposes spectral/spatial constraints defined by the Gibbs prior probability distribution $Pr(X^P)$.

Once obtained, the spatially-smooth regions can be used to condition the spectral mixing process (SMP). Define $$H = \{h^{(1)}(\lambda), \ldots, h^{(N_{ends})}(\lambda), \lambda \in \Lambda\} \qquad (21)$$

as the set of material spectra, and $H_s \subset H$ as the set of material spectra at pixel site s. At a site s, $h^{(k)} = (h^{(k)}(\lambda_1), \lambda_1 \in \Lambda)$ is the spectra for the $k^{th}$ endmember, if $h^{(k)} \in H_s$. In the case where there is one partition, $H_s$ equals H; however, in the case where there are multiple partitions, $H_s$ may be strictly contained in H. $N_{Ends}$ is the total number of fundamental materials. Recall that, unless there is accurate ground-truth information about the materials in a scene, the task of determining this number is not trivial, as discussed in the section entitled BACKGROUND. The goal is to extract the fundamental materials, termed endmembers, and associated compositions for materials imaged in a scene that cannot be observed directly, resulting in improved accuracy over existing isolated full-pixel and mixed-pixel methods.

$X^\lambda$ in Eqn. (6) is now further defined to be a wavelength-dependent random process governed by the spectral mixing relation:

$$X_s^\lambda(\lambda) = \sum_{k:h^{(k)} \in H_s} \beta_s^{(k)} \cdot h^{(k)}(\lambda) + \eta_s(\lambda) \qquad (22)$$

where $\beta_s = (\beta_s^{(k)}, k:h^{(k)} \in H_s)$ is the vector of proportions at a site s on a label lattice. The function $\eta_s(\lambda)$ is associated with error due to variance in the endmember spectra. $\hat{\beta}_s^{(k)}$ are the estimates of $\beta_s^{(k)}$ obtained through some type of constrained least squares or other means. Because the hyperspectral cube G generates discrete samples of the spectrum at specific wavelength intervals, the spectral mixing process can be approximated using standard Linear Modeling matrix notation:

$$X_s^\lambda = H_s \beta_s + \eta_s, \; s \in S_1 \qquad (23)$$

The basic SMA in Eqn. (1) is the special case of there being only one partition, i.e., Eqn. (22), as is, without the modification for the partitions.

The physics of the spectral mixing phenomenon implies that the estimate of $\beta_s$ should incorporate two constraints: a strict positivity constraining $\beta_s^{(k)} > 0$ for $k:h^{(x)} \in H_s$ and a sum to unity constraint $$\sum_{k:h^{(k)} \in H_s} \beta_s^{(k)} = 1.$$

These are properties exhibited by compositional data. Therefore, care should really be taken to treat the $\hat{\beta}_S$ as compositional data.

Making the presumption of high-quality (very low noise) data, $G = X^\lambda$. Roughly speaking, without loss of generality, any residual noise can be treated as being contained in the $\eta$ term of Eqn. (22). The full data is then constructed as $X = (X^\lambda, X^P)$; however, what is observed is not the full data, but rather only $X^\lambda$. In principle, one could obtain the marginal probability density $Pr(X^\lambda | \beta)$ by integrating out $X^P$ (from the joint density $Pr(X^\lambda, X^P | \beta)$), and then maximize the likelihood $L(\beta | X^\lambda)$.

Because of the enormous inherent complications of such a complex integration (over all possible realizable partitions!), the preferred embodiment of the present invention uses the following alternative two-step procedure, motivated by the Expectation Maximization (EM) algorithm:

Step 1: Calculate the MAP estimate of $X^P$, denoted as $X_*^P$, (the Expectation step):

$$X_*^P = \arg\max Pr(X^P|X^\lambda) \quad (24)$$

Step 2: Calculate the maximum likelihood estimate (MLE) of $\beta$, denoted as $\hat{\beta}$, (the Maximization step):

$$\hat{\beta} = \arg\max L(\beta|X^\lambda, X_*^P) \quad (25)$$

using the MAP estimate of $X^P$ as if it were "observed." This is analogous to the EM algorithm, except since $Pr(X^P|X^\lambda)$ does not depend on $\beta$ in this embodiment, the algorithm doesn't iterate as in the usual EM procedure. Dempster A., Laird N., and Rubin D., *Maximum Likelihood from Incomplete Data*, J.R. Statist. Soc., Vol 39, pp 1–38, 1977.

EXAMPLE I

Data collected using a HTYDICE system at 10,000 feet were processed using a preferred embodiment of the present invention. The scenes were collected over areas that contain a diverse range of terrain features and are supported with ground truth. The scene is represented with 300 samples by 600 lines of pixel vector data having a spatial resolution of 1.5 meters. HYDICE image cubes are represented by 210 spectral bands within a spectral range of 0.4–2.5 microns (μ), however, practical considerations limit those used for computing disparities in this example to 117 bands. These 117 bands were calibrated to reflectance by the Empirical Line method based on known spectra of calibration panels located in a region outside the scene of interest. Ground truth was established by taking data from the scene during a previous site visit. No spectral data were available from ground measurements, rather spectral; data from diverse materials, as measured by field spectrometers and collected from other sites, were used to determine the threshold for the spectral angle and Euclidian distance disparity metrics. Refer to FIG. 1 displaying ground truth overlays on Band 49 data extracted from the HYDICE cube. Description of the tagged information in FIG. 1 is provided in Table 1.

TABLE 1

Description of Ground Truth information of FIG. 1 for Trials A and B.

| Ground Truth Label | Description of the Area |
|---|---|
| A1 | Asphalt parking lot, newly paved |
| A2–A3 | Asphalt parking lot, A3a and A3b at opposite sides of apartment and different ages |
| A4–A5 | Asphalt road |
| B1 | Rooftop of a department store, light gray asphalt shingles, skylights, yellow gas pipes |
| B2A, B | School rooftop, mostly coated bubbly light gray material (B), top edge is gravel (A) |
| C1 | Concrete pavement to loading dock, some tire marks |
| C2A, B | Concrete parking lot surrounding small bank building, B is brighter than A |
| D1 | Trees: Black Willow, Texas Sugarberry, Dogwood, Texas Oak, Elbon Bush, Greenbriar |
| D3 | Trees |
| D4 | Trees: Texas Oak, Burmelia, Texas Hackberry |
| D5 | Trees: Redbud, Texas Oak |

TABLE 1-continued

Description of Ground Truth information of FIG. 1 for Trials A and B.

| Ground Truth Label | Description of the Area |
|---|---|
| D6A, B, C | Trees: Deciduous Holly, Bois D'Arc, Osage Orange, Texas Oak, Bowood |
| D7 | Scattered junipers in grassy area |
| E1 | Church and school with metal rooftops |
| E2–E6 | Corrugated steel buildings |
| G1–G6 | Tall wild grass, G5 and G6 near drainage thus healthier |
| H1 | Healthy maintained grass near bank building |
| J1 | Private residences that stand alone |
| J2 | Apartment buildings with asphalt shingled rooftops |
| J3 | Church with dark brown asphalt shingled rooftop |
| L1 | Shade from apartment buildings |
| M1 | Tennis court, concrete with blue-gray coating, lots of exposed dirt |
| N1 | Playground with exposed soil |
| O1 | Encircled area is residential with moderately-priced houses and concrete driveways |
| R1 | Light linear pattern is exposed rock |
| R2–R3 | Exposed soil |
| V1 | Asphalt road intersection with exposed soil along the shoulders |
| W1 | Playground, grass with exposed soil, gravel and some asphalt |

To validate the method of the present invention, Eqns. (15) and (16) were implemented with the disparity metrics of Eqns. (11) and (12). To establish threshold values, the spectral angles and Euclidean distance measures are computed between all the pairwise combinations in the library. Two trials were used to validate.

Trial A used a spectral angle disparity metric and Trial B used a combination spectral angle and Euclidean distance metric in the energy function. The algorithm is sensitive to the grid resolution, $\sigma$; the maximum depth of a well in the energy function, C; total number of iterations, $K_{Total}$; and the number of partition labels, $N_{Labels}$. Table 2 lists the values of these parameters. The trials proceed on a multi-grid sequence with $\sigma$=16, 8, 4, 2, and 1. The reference is the unsupervised ISODATA clustering method. The ISODATA algorithm may be used as a control method, as well it may be used as a method of initialization. For both trials A and B, the algorithm was initialized randomly and C was varied from 1.0 to 9.0 with C taking its highest value at the initial run as indicated in Table 2.

TABLE 2

Control parameters for Trials A and B.

| σ | C | Iterations | Distribution of Neighbors | No. of Neighbors |
|---|---|---|---|---|
| 16 | 9.0 | 50,000 | 16, 64, 128 | 8, 8, 8 |
| 8 | 3.0 | 3,000 | 8, 32, 64 | 8, 8, 8 |
| 4 | 3.0 | 3,000 | 4, 16, 32 | 8, 8, 8 |
| 2 | 2.0 | 700 | 2, 8, 16 | 8, 8, 8 |
| 1 | 1.0 | 350 | 1, 4, 8 | 8, 8, 8 |

Figure 2:
FIG. 2 is the scene of FIG. 1 displayed as a result of processing using the ISODATA clustering algorithm.

Refer to FIG. 2 and Table 3A for results of using the reference ISODATA clustering method on the data for six classes. Although ISODATA provides good partitioning, it is sensitive to vegetative differences in forested areas such as D1, D3–D6 (refer to FIG. 1) as well as shade. Table 3A shows that a label, A1, associated with asphalt, is used to label shade in sub-regions of D1, D3–D6 representing 27% of the areas D1, D3–D6. Of the grass areas, G1–G4, 15.7% are labeled as trees. Also, the clustering is not smooth and spatially consistent, having significant speckling.

TABLE 3A

Results Using the ISODATA Algorithm

| Labels | ISO-01 | ISO-02 | ISO-03 | ISO-04 | ISO-05 | ISO-06 |
|---|---|---|---|---|---|---|
| A1 | 0 | 0 | 518 | 0 | 0 | 0 |
| B1 | 0 | 0 | 0 | 278 | 0 | 0 |
| C1 | 0 | 0 | 0 | 13 | 107 | 0 |
| C2A | 0 | 0 | 0 | 0 | 13 | 0 |
| C2B | 0 | 0 | 0 | 0 | 11 | 0 |
| B2A | 0 | 0 | 0 | 2 | 15 | 0 |
| B2B | 0 | 0 | 0 | 12 | 110 | 0 |
| M1 | 0 | 0 | 0 | 43 | 0 | 0 |
| J3 | 0 | 0 | 33 | 44 | 0 | 0 |
| A2 | 0 | 4 | 0 | 51 | 0 | 0 |
| A3A | 0 | 0 | 0 | 16 | 0 | 0 |
| A3B | 0 | 0 | 0 | 12 | 0 | 0 |
| J2 | 0 | 0 | 84 | 0 | 0 | 0 |
| D1–6 | 2276 | 36 | 1015 | 0 | 0 | 1 |
| G1–G4 | 559 | 2989 | 3 | 0 | 0 | 8 |
| H1 | 0 | 0 | 0 | 0 | 0 | 33 |
| G5 | 101 | 0 | 0 | 0 | 0 | 71 |
| G6 | 0 | 10 | 0 | 0 | 0 | 176 |

Using observations from previous efforts, $K_{Thresh}^{(1)}$ was set to 11.0 and $K_{Thresh}^{(2)}$ was set to 100.0. Both were held constant for all trials. It is easy to distinguish different materials except for combinations having vegetative signatures. This is due to the large variance of vegetation that, in turn, makes selection of a single threshold difficult, although results indicated setting exact values of threshold was not critical.

Figure 3:
FIG. 3 is the scene of FIG. 1 displayed as a result of processing using but the single disparity metric of spectral angle and random initialization.

Refer to FIG. 3 (and FIG. 1 for all alpha-numeric designators), providing results of Trial A, using only the spectral angle metric in the energy function. It was successful in capturing the structure of many of the natural and cultural features with little of the clutter shown in FIG. 2. However, it was insensitive to desired discriminants, e.g., there is structure missing at the road intersection V1, and asphalt shingled rooftops of the apartment buildings J2 are confused with asphalt paving A3 of the parking lot.

Figure 4:
FIG. 4 is the scene of FIG. 1 displayed as a result of processing using random initialization but with two disparity metrics: spectral angle and Euclidian distance.

Refer to FIG. 4 and Table 3B (and FIG. 1 for all alpha-numeric designators), providing results of Trial B using the combined spectral angle and Euclidian distance metrics in the energy function. Comparing FIG. 4 to FIG. 3, it is clearly advantageous to use both metrics in the energy function. Many of the missing cultural members of FIG. 3 are present in FIG. 4 without the clutter. For example, the structure V1 and the rooftops J2 are evident in FIG. 4. Further, comparing the confusion table of 3B to 3A, it is evident that there is virtually no (or an extremely low percentage <1.0%) of "alternate classifications" for each of the elements of FIG. 1. Further, the elements were not affected by shade as with the reference ISODATA. Thus, an energy function using the combined metrics is optimum.

TABLE 3B

Results for the Gibbs-base algorithm using combined disparity metrics.

| Labels | CD-05 | CD-01 | CD-02 | CD-04 | CD-03 | CD-06 |
|---|---|---|---|---|---|---|
| A1 | 0 | 0 | 518 | 0 | 0 | 0 |
| B1 | 0 | 0 | 0 | 278 | 0 | 0 |
| C1 | 0 | 0 | 0 | 0 | 120 | 0 |
| C2A | 0 | 0 | 0 | 7 | 0 | 0 |
| C2B | 0 | 0 | 0 | 11 | 0 | 0 |
| B2A | 0 | 0 | 0 | 17 | 0 | 0 |
| B2B | 0 | 0 | 0 | 122 | 0 | 0 |

TABLE 3B-continued

Results for the Gibbs-base algorithm using combined disparity metrics.

| Labels | CD-05 | CD-01 | CD-02 | CD-04 | CD-03 | CD-06 |
|---|---|---|---|---|---|---|
| M1 | 41 | 0 | 0 | 0 | 2 | 0 |
| J3 | 0 | 0 | 77 | 0 | 0 | 0 |
| A2 | 0 | 0 | 55 | 0 | 0 | 0 |
| A3A | 0 | 0 | 0 | 0 | 16 | 0 |
| A3B | 0 | 0 | 0 | 0 | 12 | 0 |
| J2 | 0 | 0 | 84 | 0 | 0 | 0 |
| D1–6 | 3527 | 66 | 26 | 62 | 48 | 35 |
| G1–G4 | 1 | 3543 | 0 | 1 | 0 | 14 |
| H1 | 33 | 0 | 0 | 0 | 0 | 0 |
| G5 | 0 | 0 | 0 | 0 | 0 | 172 |
| G6 | 0 | 185 | 0 | 0 | 1 | 0 |

EXAMPLE II

A Bayesian spectral/spatial approach to segmenting hyperspectral imagery into homogeneous regions produces a spatially-smooth labeling of regions in a scene with minimal loss of significant information and scene content. For example, insignificant clutter, such as the mottled tree patterns in forested regions, is eliminated while retaining the small, but significant, terrain features such as a small rock outcrop or building. The same HYDICE data of Example I were used in this example.

Development of the unsupervised spectral/spatial approach is extended by initializing a partitioning algorithm of the present invention with another Bayesian-based classification process. By changing the assumptions governing the class-conditional and prior probability distributions, a traditional spectral-only supervised process is recovered. This provides spectrally-optimal initial estimates for the spectral/spatial partitioning process. Initializing the partitioning algorithm in this manner effectively converts the method into a supervised classifier.

For this example, the algorithm requires an initial estimate of the $\hat{x}_r^P$ realizations. These values may be initialized randomly as in Example I, in which case, during the first iteration, the estimated $\hat{x}_r^P$ realizations are assigned class labels randomly. This is a worst-case scenario. An alternative, as shown in this example, is to initialize the algorithm with the results of some prior supervised classification run.

An experiment was conducted using computer code written in C++ that implements the algorithm described in Eqns. (3) through (20). Two trials were conducted, investigating the merit of using the two-step supervised approach as compared to simply using the randomly initialized annealing approach of Example I.

In Trial C, the randomly initialized partitioning algorithm was run using the parameters shown in Table 4 for the various stages (grid sizes) of the multigrid process. $N_{Labels}$ was set to 10. As indicated in Table 4, the trials proceeded in a multigrid sequence with grid resolutions $\sigma$=16, 8, 4, 2, 1, 1. Simulated annealing was used to compute the MAP estimates using an energy function composed of the combined disparity measures that is identical to that used in Example I and previous work. Rand, R. and D. Keenan, *A Gibbs-based Unsupervised Segmentation Approach to Partitioning Hyperspectral Imagery for Terrain Applications*, Proceedings of the SPIE Aerosense, Orlando, Fla., April 2001. Rand (July 2001).

C was chosen to range from 0.05–3.0, which is below its upper bound and influences algorithm convergence as discussed in previous work. Rand (April 2001). Rand (July 2001). The value of C was set to its highest value at the initial stage of the run (corresponding to high temperature of annealing) and it was set to lower values for the subsequent stages. In addition to the practical computational advantage, a lower C value allows the algorithm to remember the results at previous stages. The distances selected for the intermediate and far neighbors shown in Table 1 correspond to fixed multiples of the grid resolution, 4 σ and 8 σ, respectively. The algorithm was initialized randomly, and then proceeded from a grid resolution of σ=16 to σ=1, using the extended neighborhood of 24 neighbors. A final pass was then made at σ=1 with a compact neighborhood comprised of 8 near neighbors.

TABLE 4

Control Parameters for Trial C

| σ | C | Iterations | Distribution of Neighbors | No. of Neighbors |
|---|---|---|---|---|
| 16 | 3.0 | 20,000 | 16, 64, 128 | 8, 8, 8 |
| 8 | 2.0 | 2,000 | 8, 32, 64 | 8, 8, 8 |
| 4 | 2.0 | 2,000 | 4, 16, 32 | 8, 8, 8 |
| 2 | 0.5 | 350 | 2, 8, 16 | 8, 8, 8 |
| 1 | 0.5 | 350 | 1, 4, 8 | 8, 8, 8 |
| 1 | 0.05 | 300 | 1 | 8 |

In Trial D, the two-step procedure outlined above was implemented. For Step 1, a supervised classification was performed using the Euclidean distance classifier. Recall that this classifier satisfies Eqn. (6), given the assumption that $\Sigma_{x_s}{}^P = I$, the Identity Matrix, for all $x_s{}^P \in \Gamma$. To facilitate a comparison, this classifier is used in preference to the quadratic classifier to establish the degree of improvement over the randomly-initialized partitioning algorithm when using the simplest of assumptions on the class-conditional distributions, as well as to ascertain the capability of the partitioning algorithm to "clean up" the results of a rather simple classifier. Further, using a quadratic classifier on the 117-band hyperspectral HYDICE imagery implicitly adds another step since it requires the intermediate step of applying a dimension reduction technique to the data, such as the Principal Component or the MNF transformation.

Using information obvious from viewing the scene and supplemented by ground truth information, 14 training classes were established. Some of these classes represent similar terrain features, such as Light Asphalt, Medium-toned Asphalt, and Dark Asphalt, thus these were combined after finishing the classification run. They were combined afterwards into the 9 classes shown in Table 5 because combining such features into a single training class would result either in a multimodal class-conditional distribution or a uni-modal class-conditional distribution of extremely high variance.

TABLE 5

Table of Classes for Trials C and D

| Class Name | Description | No. of Samples |
|---|---|---|
| Asphalt | Light asphalt, Medium asphalt, Dark asphalt | 312 |
| Concrete | Bright concrete | 120 |
| Roof L | Two light rooftops; Roof B1, Roof B2 | 162 |
| Roof H | Rooftops of asphalt-shingled houses | 17 |
| Roof B | Two brown rooftops, Roof J3, J2 | 80 |
| Soil | Exposed soil | 56 |
| Dark Trees | Dark green trees | 430 |
| Grass | Two grass regions of differing vigor | 727 |
| Grass stressed | Highly stressed grass region | 38 |

For Step 2, the partitioning algorithm was tested two different ways. First, the algorithm was initialized by the results of Step 1 at a grid size of σ=4, and then set to run through the multigrid sequence down to σ=1 according to the parameters in Table 4. Second, the algorithm was simply initialized at the finest grid size σ=1 and then run at a low annealing temperature (C=0.05) with the parameters shown in the bottom row of Table 4.

The results are very similar to the results for setting $N_{Labels}$ to 6 in previous work. Rand (April 2001). Visually, the partitioning algorithm generates smooth partitions that accurately represent structured regions in the image. For most of the larger regions, pixels with the same label represent the same type of phenomenon on the ground, globally across the image, and regions with different labels correspond to different phenomenon. However, a completely globally consistent labeling of the partitions was not achieved. In particular, labeling problems are observed in some of the smaller regions. Although the contiguous pixels in smaller partitions represent the same phenomenon, locally, some small partitions, separated by a certain amount of distance and given the same labels, actually represent different phenomenon. Conversely, some small partitions, separated by a certain amount of distance and given different names, actually represent similar phenomenon.

Figure 5:
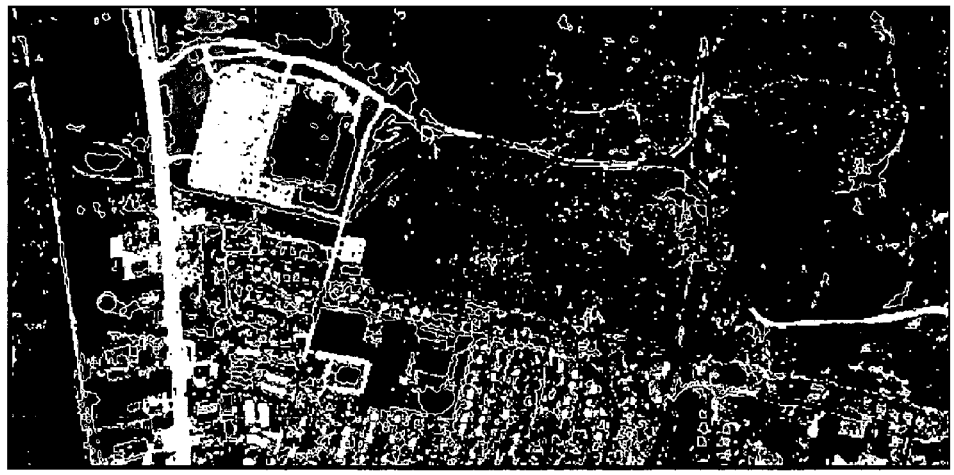
FIG. 5 shows a class map of FIG. 1 for a randomly initialized unsupervised partitioning algorithm in Trial C using the parameters in Table 4.
Figure 6:
FIG. 6 is the scene of FIG. 1 displayed as a result of processing using a conventional Bayesian estimate for initialization and the spectral-only Euclidean classifier.
Figure 7:
FIG. 7 shows the results of implementing the partitioning algorithm by initializing at the finest grid size, $\sigma=1$, and then running it with the parameters shown in the bottom row of Table 4.

FIGS. 6 and 7 show the resulting class maps for Trial D. The class map in FIG. 6 is the result of the spectral-only Euclidean classifier. Visually, the map accurately portrays many of the structures in the scene and does a better job at extracting linear terrain features, such as roads, than the randomly initialized algorithm in Trial C of FIG. 5; however, it does so with a severe amount of speckling.

FIG. 7 shows the results of the latter of the two implementations tested for Step 2. This implementation has the partitioning algorithm initialized at the finest grid size, σ=1, and then run with the parameters shown in the bottom row of Table 4. Visually, this class map shows a significant improvement over those shown in FIGS. 5 and 6. The method retains the structure and the linear terrain features extracted by the Euclidean classifier in FIG. 5 while eliminating most of the speckling of FIG. 6.

An important finding demonstrates that whereas a multi-grid implementation is the preferred approach when the algorithm is initialized randomly, the latter (single pass) implementation is preferred for the two-step method, outlined above.

Tables 5–8 provide supporting quantitative results regarding the labeling in the class maps of Trial D. Tables 5 and 6 provide auto-classification results, listing the percentage of sites in each of the "training" regions that have been assigned to a particular training class, i.e., labeled as belonging to a particular classification, for Step 1 and Step 2, respectively. Tables 7 and 8 provide classification results for test data extracted from the scene of FIG. 1 based on ground-truth, listing the percentage of sites in each of the test regions that have been labeled.

Table 5 lists the percentage of sites in each of the training regions that have been assigned, to a particular training class, i.e., training data are self-tested. Percentages highlighted in bold, and expected to be on the diagonal, are considered to be correct assignments.

TABLE 5

Quantitative Results for Test Data in Trial D

|  | Asphalt % | Concrete % | Roof L % | Roof H % | Roof B % | Soil % | Trees % | Grass % | Stressed Grass-% | Data Points |
|---|---|---|---|---|---|---|---|---|---|---|
| Asphalt | 99.7 | 0 | 0 | 0 | 0 | 0 | 0 | 0 | 0 | 312 |
| Concrete | 6.7 | 54.2 | 31.7 | 0 | 0 | 7.5 | 0 | 0 | 0 | 120 |
| Roof L | 1.2 | 4.9 | 92.6 | 1.2 | 0 | 0 | 0 | 0 | 0 | 162 |
| Roof H | 0 | 0 | 5.9 | 94.1 | 0 | 0 | 0 | 0 | 0 | 17 |
| Roof B | 6.3 | 0 | 0 | 0 | 93.8 | 0 | 0 | 0 | 0 | 80 |
| Soil | 0 | 1.8 | 0 | 0 | 0 | 98.2 | 0 | 0 | 0 | 56 |
| Dark Trees | 3.5 | 0 | 0 | 0 | 5.8 | 0 | 63.5 | 27.2 | 0 | 430 |
| Grass | 0.1 | 0 | 0 | 0 | 0 | 0 | 3.6 | 95.9 | 0.4 | 727 |
| Stressed Grass | 0 | 0 | 0 | 0 | 0 | 0 | 0 | 0 | 100 | 38 |

TABLE 6

Quantitative Results Initialized Using the Euclidian Distance Classifier

|  | Asphalt % | Concrete % | Roof L % | Roof H % | Roof B % | Soil % | Trees % | Grass % | Stressed Grass-% | Data Points |
|---|---|---|---|---|---|---|---|---|---|---|
| Asphalt | 100 | 0 | 0 | 0 | 0 | 0 | 0 | 0 | 0 | 312 |
| Concrete | 0.8 | 86.7 | 12.5 | 0 | 0 | 0 | 0 | 0 | 0 | 120 |
| Roof L | 0 | 0 | 100 | 0 | 0 | 0 | 0 | 0 | 0 | 162 |
| Roof H | 0 | 0 | 0 | 100 | 0 | 0 | 0 | 0 | 0 | 17 |
| Roof B | 0 | 0 | 0 | 0 | 100 | 0 | 0 | 0 | 0 | 80 |
| Soil | 0 | 0 | 0 | 0 | 0 | 100 | 0 | 0 | 0 | 56 |
| Dark Trees | 2.1 | 0 | 0 | 0 | 0 | 0 | 82.8 | 15.1 | 0 | 430 |
| Grass | 0 | 0 | 0 | 0 | 0 | 0 | 0.7 | 99.3 | 0 | 727 |
| Stressed Grass | 0 | 0 | 0 | 0 | 0 | 0 | 0 | 0 | 100 | 38 |

Table 6 shows results of testing done as for Table 5 except that the initialization was done using a non-random Euclidian Distance Classifier. A comparison of Tables 5 and 6 demonstrate a clear benefit to using the algorithm with a non-randomized intializer. Table 6 shows that when the non-randoimly initialized algorithm is applied to its own training data, the percentage of correct labeling increases for eight out of the nine classes. For the ninth class, the classification accuracy was already 100% so there was no possibility of improvement.

TABLE 7

Quantified Results Using Only the Euclidian Classifier

|  | Asphalt % | Concrete % | Roof L % | Roof H % | Roof B % | Soil % | Trees % | Grass % | Stressed Grass-% | Data Points |
|---|---|---|---|---|---|---|---|---|---|---|
| Asphalt_Lt | 80.4 | 0 | 0 | 0 | 18.5 | 0 | 0 | 1.1 | 0 | 92 |
| Asphalt_Med | 86.6 | 0 | 0 | 0 | 13.4 | 0 | 0 | 0 | 0 | 97 |
| Asphalt_Dk | 100 | 0 | 0 | 0 | 0 | 0 | 0 | 0 | 0 | 437 |
| Roof, B1 | 0 | 0 | 100 | 0 | 0 | 0 | 0 | 0 | 0 | 173 |
| Concrete | 0 | 87.5 | 12.5 | 0 | 0 | 0 | 0 | 0 | 0 | 24 |
| Roof, Gravel | 11.8 | 82.4 | 5.9 | 0 | 0 | 0 | 0 | 0 | 0 | 17 |
| Roof, B2 | 6.3 | 17.2 | 76.6 | 0 | 0 | 0 | 0 | 0 | 0 | 64 |
| Tennis Court | 2.3 | 0 | 0 | 97.7 | 0 | 0 | 0 | 0 | 0 | 43 |
| Roof, House | 0 | 0 | 24.4 | 66.7 | 8.9 | 0 | 0 | 0 | 0 | 45 |
| Roof J3 | 5.1 | 0 | 0 | 0 | 94.9 | 0 | 0 | 0 | 0 | 39 |
| Roof J2 | 7.1 | 0 | 0 | 0 | 92.9 | 0 | 0 | 0 | 0 | 42 |
| Soil, Light | 0 | 11.6 | 0 | 0 | 0 | 88.4 | 0 | 0 | 0 | 138 |
| Soil, Tan | 10.7 | 66.7 | 0.6 | 0 | 0 | 20.1 | 0 | 0.6 | 1.3 | 159 |
| Grass, Wild | 0.2 | 0 | 0 | 0 | 0.7 | 0 | 18.9 | 74.7 | 5.5 | 1700 |
| Trees, Dark | 5.5 | 0 | 0 | 0 | 11.6 | 0 | 66.9 | 16.0 | 0 | 1591 |
| StressedGrass | 0 | 0 | 0 | 0 | 0 | 0 | 0 | 0 | 100 | 35 |

TABLE 8

Quantified Results Using Partitioning Algorithm Initialized with the Euclidian Classifier

|  | Asphalt % | Concrete % | Roof L % | Roof H % | Roof B % | Soil % | Trees % | Grass % | Stressed Grass-% | Data Points |
|---|---|---|---|---|---|---|---|---|---|---|
| Asphalt_Lt | 84.8 | 0 | 0 | 0 | 14.1 | 0 | 0 | 1.1 | 0 | 92 |
| Asphalt_Med | 96.9 | 0 | 0 | 0 | 3.1 | 0 | 0 | 0 | 0 | 97 |
| Asphalt_Dk | 100 | 0 | 0 | 0 | 0 | 0 | 0 | 0 | 0 | 437 |
| Roof, B1 | 0 | 0 | 100 | 0 | 0 | 0 | 0 | 0 | 0 | 173 |
| Concrete | 8.3 | 87.5 | 4.2 | 0 | 0 | 0 | 0 | 0 | 0 | 24 |
| Roof, Gravel | 0 | 100 | 0 | 0 | 0 | 0 | 0 | 0 | 0 | 17 |
| Roof, B2 | 0 | 0 | 100 | 0 | 0 | 0 | 0 | 0 | 0 | 64 |
| Tennis Court | 0 | 0 | 0 | 100 | 0 | 0 | 0 | 0 | 0 | 43 |
| Roof, House | 0 | 0 | 22.2 | 77.8 | 0 | 0 | 0 | 0 | 0 | 45 |
| Roof J3 | 0 | 0 | 0 | 0 | 100 | 0 | 0 | 0 | 0 | 39 |
| Roof J2 | 0 | 0 | 0 | 0 | 100 | 0 | 0 | 0 | 0 | 42 |
| Soil, Light | 0 | 11.6 | 0 | 0 | 0 | 88.4 | 0 | 0 | 0 | 138 |
| Soil, Tan | 3.8 | 91.8 | 0.6 | 0 | 0 | 1.9 | 0 | 0 | 1.9 | 159 |
| Grass, Wild | 0 | 0 | 0 | 0 | 0 | 0 | 20.2 | 74.8 | 5.0 | 1700 |
| Trees, Dark | 3.0 | 0 | 0 | 0 | 3.1 | 0 | 87.9 | 6.0 | 0 | 1591 |
| StressedGrass | 0 | 0 | 0 | 0 | 0 | 0 | 0 | 0 | 100 | 35 |

Tables 7 and 8 present data using the original 14 selected classes in the rows and the nine classes of Tables 5 and 6 in the columns. Tables 7 and 8 demonstrate that applying the partitioning algorithm to data from regions "outside" of that selected as the training data yields consistent and significant improvement in accuracy. Of the 15 test regions, there was improvement in nine of the regions, with no improvement in only three of the regions. There was no possibility of improvement for two of the region (100% accuracy), and there was a decrease in one of the regions. Note that the degree of improvement was sometimes substantial. For example, the accuracy of the test region for trees improved from 66.9% to 87.9%.

In the case where there was a decrease in accuracy, the partitioning algorithm was operating in an appropriate manner. The spectral signatures of concrete and soil are quite similar (concrete being composed of soil/silicate materials) and consequently simple classifiers often confuse these two classes. The Euclidean classifier initialized incorrectly, labeling 66.7% of the soil region as concrete and another 10.7% as asphalt, resulting in correct labeling of only 20.1% of the sites at the initialization step. Understandably, the partitioning algorithm then proceeded to expand the incorrect concrete labeling to 91.8%.

The results show that spatially smooth labeling may be achieved without decreasing the accuracy of classification. Tables 5–8 show an overall increase, not decrease, in classification accuracy when going from the spectral-only to the spectral/spatial process. Furthermore, FIG. 7 shows that much of the speckling and edge artifacts in a scene labeling can be removed without removing spectrally significant individual pixels. For example, observing the parking lot adjacent to the department store (upper-left corner) in FIG. 7, the single vehicles are not removed, whereas the edge artifacts of the roads and the clutter in the forest and grass regions throughout the scene are mostly removed.

In summary, in one embodiment of the present invention, a Bayesian framework is used to develop a 2-step supervised classification algorithm that is capable of performing high quality spatially smooth labeling of hyperspectral imagery. To demonstrate the concept, a linear classifier was used to initialize a Gibbs-based partitioning algorithm resulting in significantly improved label accuracy and smoothness as compared to using only the linear classifier without the partitioning algorithm. In addition, the global labeling accuracy was increased as compared to the stand-alone randomly initialized partitioning algorithm of Example I. In order to achieve a reasonable global labeling accuracy, the randomly initialized (unsupervised) partitioning algorithm is best implemented as a multigrid process using an extended neighborhood system. However, initializing the partitioning algorithm with even the simplest of spectral-only supervised classifiers not only improves the global accuracy, but it also reduces the computation by eliminating the need for a multigrid process and allowing the annealing to start at a cooler temperature.

This shows that spatially smooth labeling does not have to occur at the cost of classification accuracy, which has been the case with a number of post-processing methods that simply apply spatial constraints to a spectral-based classification.

Provided as Appendices are the seminal works of the inventors which led to the embodiments of the present invention and contain examples of applications thereof.

Appendices

Appendix A

Rand, R. and D. Keenan, *A Gibbs-based Unsupervised Segmentation Approach to Partitioning Hyperspectral Imagery for Terrain Applications, Proceedings of the SPIE Aerosense*, Orlando, Fla., April 2001.

Appendix B

Rand, Robert S. and Daniel M. Keenan, *A Spectral Mixture Process Conditioned by Gibbs-Based Partitioning*, IEEE Transactions on Geoscience and Remote Sensing, Vol. 39, No. 7, pp. 1421–1434, July 2001.

Appendix C

Rand, R. and D. Keenan, *A Multigrid Gibbs-Based Algorithm to Segment Hyperspectral Imagery Using a Combined Spectral Measure of Disparity*, IEEE Computer Society Conference on Computer Vision and Pattern Recognition, Kauai, Hi., December 2001.

Appendix D

Rand, R. and D. Keenan, *Multigrid Partitioning of Hyperspectral Imagery Using Spectral/Spatial Measures of Disparity*, submitted to *IEEE Transactions on Geoscience and Remote Sensing*, January 2002.

Appendix E

Rand R., *Spectral/Spatial Annealing of Hyperspectral Imagery Initialized by a Supervised Classification Method*, Proceedings of the SPIE Aerosense 2002, Orlando Fla., April 2002.

Other relevant publications include:

Clustering and Partitioning Methods

Aarts, E. and J. Korst, *Simulated Annealing and Bolzmann Machines—A Stochastic Approach to Combinatorial Optimization and Neural Computing*, Interscience Series in Discrete Mathematics and Optimization, John Wiley and Sons, 1989, Reprint 1990.

Besag, J., *Towards Bayesian Image Analysis*, Supplement to Journal of Applied Statistics, Vol. 20, Nos. 5/6, 1993.

Bosch, E., and R. Rand, *Evaluation of a Matrix Factorization Method for Data Reduction and the Unsupervised Clustering of Hyperspectral Data Using Second Order Statistics*, Proceedings of the SPIE Aerosense 2001, Orlando Fla., April 2001.

Geman S. et al., *Boundary Detection by Constrained Optimization*, IEEE Transactions on Pattern Analysis and Machine Intelligence, Vol. 12, No. 7, July 1990.

Geman, S. and D. Geman, *Stochastic Relaxation, Gibbs Distributions, and the Bayesian Restoration of Images*, IEEE Transactions on Pattern Analysis and Machine Intelligence, Vol. 6, No. 6, November 1984.

Gidas, B., *A Renormalization Group Approach to Image Processing Problems*, IEEE Transactions on Pattern Analysis and Machine Intelligence, Vol. 2, No. 2, February, 1989.

Hazel, G., *Multivariate Gaussian MRF for Multispectral Scene Segmentation and Anomaly Detection*, IEEE Transactions on Geoscience and Remote Sensing, Vol. 38 (3), May 2000.

Spectral Mixture Analysis

Adams J. et al., *Spectral Mixture Modeling: A New Analysis of Rock and Soil Types at the Viking Lander 1 Site*, J. Geophysical Research, Vol. 91, July 1986.

Bayliss J. et al., *Analyzing Hyperspectral Data with Independent Component Analysis*, Applied Image and Pattern Recognition Workshop, Proceedings SPIE 3240, pp. 133–143, 1997.

Boardman J., *Leveraging the High Dimensionality of AVIRIS Data for Improved Subpixel Target Unmixing and Rejection of False Positives: Mixture Tuned Matched Filtering*, Proceedings of the Ninth Annual JPL Airborne Geoscience Workshop, JPL, 1998.

Chang C. and D. Heinz, *Constrained Subpixel Target Detection for Remotely Sensed Imagery*, IEEE Transactions on Geoscience and Remote Sensing, Vol. 38, No. 3, May 2000.

Harsanyi J. and C. Chang, Hyperspectral Image Classification and Dimensionality Reduction: an Orthogonal Subspace Projection Approach, IEEE Transactions on Geoscience and Remote Sensing, Vol. 32, No. 4, July 1994.

Harsanyi J. et al., *Detection of Subpixel Signatures in Hyperspectral Image Sequences*, Proceedings of the American Society of Photogrammetry and Remote Sensing, Reno, Nev., pp 236–247, 1994.

Harsanyi J. et al., *Automatic Identification of Spectral Endmembers in Hyperspectral Image Sequences*, Proceedings of the International Symposium on Spectral Sensing Research (ISSSR), San Diego, Calif., 1994.

Ifarraguerri, A. and C. Chang, *Multispectral and Hyperspectral Image Analysis with Convex Cones*, IEEE Transactions on Geoscience and Remote Sensing, Vol. 37, No. 2, March 1999.

Nichols N. et al., *Comparative Performance of the Mixture-Tuned Matched Filter (MTMF) vs. the Mixture-Tuned Matched Subspace Filter (MTMSF)*, Proceedings of the International Symposium on Spectral Sensing Research (ISSSR), Las Vegas Nev., 31 Oct–4 Nov 1999.

Tu T., *Unsupervised Signature Extraction and Separation in Hyperspectral Images: a Noise-Adjusted Fast Independent Component Analysis*, Optical Engineering, Vol. 39, April 2000.

General Classification, Pattern Recognition Methods

Dempster A., Laird N., and Rubin D., *Maximum Likelihood from Incomplete Data*, J.R. Statist. Soc., Vol 39, pp 1–38, 1977

Duda R. and P. Hart, *Pattern Classification and Scene Analysis*, John Wiley and Sons, 1973.

Green A. et al., *A Transformation for Ordering Multispectral Data in Terms of Image Quality with Implications for Noise Removal*, IEEE Transactions on Geosciences and Remote Sensing, Vol. 26, January 1988.

Lee J. et al., *Enhancement of High Spectral Resolution Remote Sensing Data by a Noise-Adjusted Principal Components Transform*, IEEE Transactions on Geoscience and Remote Sensing, Vol. 28, No. 3, May 1990.

Montgomery D. and E. Peck, *Introduction to Linear Regression Analysis*, $2^{nd}$ Ed., Wiley Series in Probability and Mathematical Statistics, John Wiley and Sons, 1992.

Although specific types of image processing are discussed, other similar configurations or methods, including those that may have only some of the constituents or steps used in the above examples, may be suitable for classifying and identifying structure and thus fall within the ambit of a preferred embodiment of the present invention as provided in the claims herein.

We claim:

1. A method for enhancing an image containing endmembers, comprising:
  selecting at least one measure of disparity;
  partitioning at least one first set of said endmembers in said image into at least
  one second set of said endmembers, each said second set incorporating at least
  one site having some spectral content,
 wherein said at least one site is a generic element of a lattice, and
 wherein spatial consistency is imposed on said spectral content of each said site so that each said at least one second set is associated with a spatially smooth region in said image; and
  using said at least one measure of disparity, applying a linear mixing model to said at least one second set to globally label said at least one second set,
 wherein said method yields improvements in:
  assessment of the type and amount of materials in a scene,
  unsupervised clustering of a scene, and post-processing smoothing operations suitable for application to diverse techniques for terrain categorization and classification.

2. The method of claim 1 in which a multi-grid Gibbs-based algorithm is used to partition said at least one first set of said endmembers,
   wherein said algorithm is used to estimate an underlying and unobserved process, $X^P$, a discrete labeling Markov Random Field (MRF) process, that associates a label with each said site, and
   wherein said $X^P$ is used to condition a spectral mixing process (SMP), and
   wherein said $X^P$ identifies each said site that may be treated as homogeneous, and
   wherein said partitioning may proceed with multiple material types incorporated within each said site.

3. The method of claim 2 in which said partitioning using said multi-grid Gibbs-based algorithm proceeds in stages from coarse toward fine grid resolutions,
   wherein the number of said stages is defined by the lattice structure of a neighborhood, $\xi_s$, forming a simple pattern such that a neighborhood of each said lattice element comprises near, intermediate, and far neighbors that are specific multiples of the grid resolution, $\sigma$, and
   wherein the near neighbors are closest said lattice elements that may touch said site even if only at said site's corners, and
   wherein the next 16 said lattice elements are intermediate neighbors, and
   wherein the far neighbors are the 24 said lattice elements on the outside of said next 16 lattice elements, thus forming perimeter layers away from said site of interest at multiples of said $\sigma$, and
   wherein use of said intermediate and far neighbors facilitates a faster global solution than using just said near neighbors, and
   wherein use of said intermediate and far neighbors also enables said algorithm to remember label assignments from prior said stages, and
   wherein said $\sigma$ determines the spatial sampling of said algorithm at some specific said stage of multi-grid processing, such that at full resolution, i.e., $\sigma=1$, said site corresponds to a single said lattice element, and
   wherein all coarse resolutions involve neighborhoods of said lattice elements forming a square in which said $\sigma$ is the number of pixels along one side of said square.

4. The method of claim 2 in which said Gibbs-based algorithm is initialized conventionally, wherein said initialization enables a post-processing smoothing algorithm that may operate on the output of at least one classification technique.

5. The method of claim 2 in which said partitioning is initialized randomly, wherein said randomly initialized partitioning algorithm is best implemented as a multigrid process using an extended neighborhood system to attain reasonable global labeling accuracy.

6. The method of claim 2 in which said partitioning is initialized using a pre-processing scheme.

7. The method of claim 6 in which said pre-processing scheme is a recognized classification technique.

8. The method of claim 7 in which said recognized classification technique is supervised.

9. The method of claim 7 in which said recognized classification technique is unsupervised.

10. The method of claim 2 in which said multi-grid Gibbs-based algorithm uses an energy function to model distinctions in said image,
    wherein, using the Gibbs Equivalent Theorem with an appropriately defined graph, $\{S_P^{(o)}, \xi^{P(o)}\}$, said Gibbs-based algorithm may be derived, and
    wherein a maximum a posteriori (MAP) estimate may be computed that maximizes $Pr(X^P|g)$ by iteratively sampling from the local Gibbs distribution pertaining to each said site, $s \in S_P^{(o)}$, and
    wherein computational intensity is reduced and said global labeling is improved.

11. The method of claim 10 in which said MAP estimate of $X^P$, denoted as $X_*^P$, is calculated in a first step, termed the Expectation Step, by:

$$X_*^P = \arg\max Pr(X^P|X^{80})$$ and the maximum likelihood estimate (MLE) of a vector of proportions on a label lattice, $\beta$, denoted as $\hat{\beta}$, is calculated in a second step, termed the Maximization Step, by:

$$\hat{\beta} = \arg\max L(\beta|X^\lambda, X_*^P)$$

wherein said MAP estimate of $X^P$ is used as if it were observed, and
   wherein complex integration over all possible realizable partitions is avoided by said two-step process.

12. The method of claim 10 in which said MAP estimate is computed using ratios of the relationship:

$$Pr(X_s^P = x_s^P | X_r^P = x_r^P, r \neq s) = Pr(X_s^P = x_s^P | X_r^P = x_r^P, r \in \xi_s^{P(\sigma)})$$
$$= \frac{1}{Z_s} e^{-\frac{1}{T} U_s(x_s^P, g)}$$

where:

$$Z_s = \sum_{x_s^P \in \Gamma} e^{-\frac{1}{T} U_s(x_s^P, g)}$$

and $U_s(x_s^P, g)$ = energy interaction of site $s \in S_P^{(o)}$ with the neighborhood $\xi_s^{P(o)}$.

13. The method of claim 1 in which said at least one measure of disparity is selected from the group consisting essentially of spectral angle, Euclidian distance, classical Kolmogorov-Smirnov measures, mean adjusted Kolmogorov-Smirnov measures, and combinations thereof,
    wherein said image is defined with respect to a local neighborhood.

14. The method of claim 13 in which said local neighborhood comprises at least one non-traditional and locally-extended neighborhood.

15. The method of claim 1 in which parameters of said linear mixing model are estimated based on said endmembers in said at least one second set being associated with appropriate said sites therein to enable computation of an enhanced spectral mixing process (SMP),
    wherein the set of material spectra, H, is represented as $$H = \{h^{(1)}(\lambda), \ldots, h^{(Nends)}(\lambda), \lambda \in \Lambda\}$$

and $H_s \subset H$ is the set of material spectra at a pixel site s, $N_{Ends}$ is the total number of said endmembers, and the spectra for the $k^{th}$ said endmember is given by $h^{(k)} = (h^{(k)}(\lambda_1), \lambda_1 \in \Lambda)$, if $h^{(k)} \in H_s$.

16. The method of claim 1 further employing a simulated annealing method of partitioning hyperspectral imagery, said simulated annealing method initialized by a supervised classification method to provide spatially smooth class labeling for terrain mapping applications.

17. The method of claim 1 providing an estimate of said model as a Gibbs distribution defined over a symmetric spatial neighborhood system that is based on an energy function characterizing spectral disparities in both Euclidean distance and spectral angle, wherein said energy function depends on distance measures termed disparity metrics that provide a measure of the dissimilarity between an individual said site, s, and said individual site's neighbor, r.

18. An efficient and accurate method for extracting features from hyperspectral data representing a scene by implementing a spectrally-optimal supervised classification algorithm that has been smoothed by a post-processing routine that imposes spectral/spatial constraints defined by the Gibbs prior probability distribution, $Pr(X^P)$.

19. A method for extracting features from hyperspectral data representing a scene by initializing a partitioning algorithm with the results of a classifier to improve classification by providing initial estimates based on labels that, as applied under the proper conditions, are spectrally optimal, comprising:

a) performing a classification of the scene using a supervised classifier that selects the labeling $\hat{x}_s^P$ at each said site s that maximizes the probability $Pr(X_s^\lambda | X_s^P)$ of a process that is approximately of the form of $X_s^\lambda | X_s^P = \arg\max N(\mu_{x_s^P}, \Sigma_{x_s^P})$ where:

$\mu_{x_s^P}$ = the mean of the soectral vectors for the class label, $x_s^P$ $\Sigma_{x_s^P}$ = the covariance of the specttral vectors; and b) initializing by the results in Step a), performing a spectral/spatial partitioning of said scene using the relationship:

$$Pr(X_s^P = x_s^P | X_r^P = x_r^P, r \neq s) = Pr(X_s^P = x_s^P | X_r^P = x_r^P, r \in \xi_s^{P(\sigma)})$$

$$= \frac{1}{Z_s} e^{-\frac{1}{T} U_s(x_s^P, g)}$$

where:

$$Z_s = \sum_{x_s^P \in \Gamma} e^{-\frac{1}{T} U_s(x_s^P, g)}$$

$U_s(x_s^P, g)$ = energy interaction of site $s \in S_P^{(o)}$ with the neighborhood $\xi_s^{P(o)}$.

20. A method employing a simulated annealing method of partitioning hyperspectral imagery for extracting features from hyperspectral data representing a scene, comprising:

using a Bayesian framework to develop a 2-step supervised Gibbs-based classification algorithm, wherein said algorithm is capable of performing high quality spatially smooth labeling of said hyperspectral data; and using a linear classifier to initialize said Gibbs-based partitioning algorithm, wherein said initializing results in improved label accuracy and smoothness as compared to using only said linear classifier without said Gibbs-based partitioning algorithm, and wherein global labeling accuracy is increased as compared to a stand-alone randomly initialized said Gibbs-based partitioning algorithm, and wherein said initializing said Gibbs-based partitioning algorithm with said linear classifier also reduces the computation by eliminating the need for a multi-grid process and by allowing said simulated annealing to start at a cooler temperature.

* * * * *